(12) United States Patent
Liang et al.

(10) Patent No.: US 10,492,475 B2
(45) Date of Patent: Dec. 3, 2019

(54) AQUARIUM FILTRATION SYSTEM

(71) Applicant: Aqua Design Innovations, LLC, San Francisco, CA (US)

(72) Inventors: Kevin Z. Liang, San Francisco, CA (US); Dillon J. Rak, San Diego, CA (US); Timothy Langer, Del Mar, CA (US)

(73) Assignee: AQUA DESIGN INNOVATIONS, LLC, San Francisco, CA (US)

( * ) Notice: Subject to any disclaimer, the term of this patent is extended or adjusted under 35 U.S.C. 154(b) by 0 days.

(21) Appl. No.: 15/905,587

(22) Filed: Feb. 26, 2018

(65) Prior Publication Data

US 2019/0000048 A1 Jan. 3, 2019

Related U.S. Application Data

(63) Continuation of application No. 14/473,417, filed on Aug. 29, 2014, now Pat. No. 9,901,078.

(60) Provisional application No. 61/959,663, filed on Aug. 29, 2013.

(51) Int. Cl.
| | |
|---|---|
| *A01K 63/04* | (2006.01) |
| *C02F 3/32* | (2006.01) |
| *C02F 1/32* | (2006.01) |
| *A01K 63/06* | (2006.01) |

(52) U.S. Cl.
CPC ............ *A01K 63/045* (2013.01); *A01K 63/06* (2013.01); *C02F 1/32* (2013.01); *C02F 1/325* (2013.01); *C02F 3/32* (2013.01)

(58) Field of Classification Search
CPC ......... A01K 63/045; A01K 63/06; C02F 3/32; C02F 1/32; C02F 1/325
USPC ......... 210/167.21, 167.22, 167.27, 232, 251, 210/258, 416.1, 416.2, 748.1, 748.11, 210/602; 119/259, 260
See application file for complete search history.

(56) References Cited

U.S. PATENT DOCUMENTS

| | | | | |
|---|---|---|---|---|
| 4,601,821 A | * | 7/1986 | Sherman ............. | A01K 63/045 |
| | | | | 210/282 |
| 4,754,571 A | * | 7/1988 | Riechmann ............. | A01G 9/00 |
| | | | | 47/59 R |
| 5,054,424 A | * | 10/1991 | Sy ........................ | A01K 63/045 |
| | | | | 119/231 |
| 5,087,353 A | * | 2/1992 | Todd ....................... | C02F 1/32 |
| | | | | 210/151 |
| 5,618,428 A | * | 4/1997 | Oslund ................ | A01K 63/045 |
| | | | | 119/246 |
| 5,653,877 A | * | 8/1997 | Mark ....................... | A61L 2/10 |
| | | | | 210/259 |

(Continued)

*Primary Examiner* — Fred Prince (74) *Attorney, Agent, or Firm* — Kilpatrick Townsend & Stockton LLP (57) ABSTRACT

A filtration system and filtration unit are disclosed herein. The filtration system can include an aquarium and the filtration unit. The filtration unit can attach to the aquarium. The filtration unit can include a pump that circulates water through the filtration unit and a plurality of chambers. The plurality of chambers of the filtration unit can include a sterilization chamber, a pre-filtration chamber, and a root chamber. The sterilization chamber can include a sterilization feature that sterilizes the water circulating through the filtration unit, the pre-filtration chamber can remove large objects from the water, and the root chamber can contain a root network of a plant.

20 Claims, 9 Drawing Sheets

(56) References Cited

U.S. PATENT DOCUMENTS

| | | | |
|---|---|---|---|
| 5,799,612 A * | 9/1998 | Page | A01K 63/045 |
| | | | 119/260 |
| 6,447,720 B1 * | 9/2002 | Horton, III | A61L 2/10 |
| | | | 210/748.11 |
| 9,161,519 B1 * | 10/2015 | Wellington | A01K 63/045 |
| 9,901,078 B2 * | 2/2018 | Liang | A01K 63/06 |
| 2008/0061010 A1 * | 3/2008 | Tom | A01K 63/045 |
| | | | 210/767 |
| 2010/0031893 A1 * | 2/2010 | Bodlovich | C02F 3/32 |
| | | | 119/227 |
| 2012/0037571 A1 * | 2/2012 | Felix | C02F 1/325 |
| | | | 210/748.11 |
| 2013/0175711 A1 * | 7/2013 | Nutter | F24F 6/02 |
| | | | 261/30 |
| 2014/0223819 A1 * | 8/2014 | Coghlan | A01K 63/045 |
| | | | 47/62 R |

* cited by examiner

AQUARIUM FILTRATION SYSTEM

CROSS-REFERENCES TO RELATED APPLICATIONS

This application is a continuation of U.S. application Ser. No. 14/473,417, filed on Aug. 29, 2014, and entitled "AQUARIUM FILTRATION SYSTEM," which claims the benefit of U.S. Provisional Application No. 61/959,663, filed on Aug. 29, 2013, and entitled "AQUAPONICS PLANT FILTER," the entirety of which are hereby incorporated by reference herein.

BACKGROUND

Animals, typically fish, kept in an aquarium, such as a fish tank produce waste from excrement and respiration. Additionally, uneaten food or dead and/or decaying biological material such as dead or decaying plants and/or animals including fish are also a source of waste in an aquarium. These waste products collect in the aquarium and contaminate the water. As the degree of contamination rises, the risk to the health of the aquarium increases and removal of the contamination becomes critical. Filtration is a common method used for maintenance of healthy aquaria.

Aquarium filters are critical components of both freshwater and marine aquaria. Aquarium filters remove physical and soluble chemical waste products from aquaria, simplifying maintenance. Furthermore, aquarium filters are necessary to support life in an aquarium as aquaria are relatively small, closed volumes of water compared to the natural environment in which most plants and animals, including fish live. While current filter technology provides many benefits over unfiltered aquaria, there are still shortcomings in these designs. Thus, new filtration systems, methods, and devices are desired.

BRIEF SUMMARY

One aspect of the present disclosure relate to a filtration system. The filtration system can include an aquarium that can have a bottom and a plurality of sides that define a volume that can hold water, and a filtration unit attached to the aquarium. In some embodiments, the filtration unit can include a top and a bottom. The filtration unit can have a root basket that can receive and hold a portion of a root system of a plant, a root chamber at least partially encompassing the root basket, which root chamber can hold the root system of the plant, and which root chamber has a spout proximate to the top of the filtration unit and an inlet proximate to the bottom of the filtration unit, and a pump that can pump water into the filtration unit and can circulate water through the inlet of the root chamber to the spout of the root chamber.

In some embodiments, the filtration unit includes a sterilization chamber. In some embodiments, the pump can circulate water through the sterilization chamber before circulating the water through the inlet of the root chamber. In some embodiments, the sterilization chamber can have a UV LED that can illuminate water passing through the sterilization chamber. In some embodiments, the filtration unit can include a pre-filtration chamber that can be separated from the sterilization chamber by a first wall. In some embodiments, the pump can circulate water over the first wall and into the pre-filtration chamber.

In some embodiments, the filtration unit can include a root cage located in the root chamber, which can be designed to allow water to flow through the root cage. In some embodiments, the root cage is at least partially filled with aggregate. In some embodiments, the aggregate can be at least one of lava rocks and activated carbon pellets. In some embodiments, the filtration unit can include a light support having a plurality of lights, which lights can illuminate the top of the filtration unit. In some embodiments, the light support is moveable between a first position and a second position, and in some embodiments, the light support is relatively closer to the top of the filtration unit in the first position than in the second position.

One aspect of the present disclosure relates to a filtration unit. The filtration unit can include a top, a bottom, a root basket proximate to the top of the filtration unit, which root basket can receive and hold a portion of a root system of a plant, a root chamber at least partially encompassing the root basket, which root chamber can include spout and an inlet proximate to the bottom of the filtration unit, and a pump that can circulate water from the inlet of the root chamber to the spout of the root chamber.

In some embodiments, the filtration unit can include a sterilization chamber. In some embodiments, the pump can circulate water through the sterilization chamber before circulating the water through the inlet of the root chamber. In some embodiments, the sterilization chamber can include a UV LED that can illuminate water passing through the sterilization chamber.

In some embodiments, the filtration unit can include a pre-filtration chamber, which pre-filtration chamber can be separated from the sterilization chamber by a first wall. In some embodiments, the pump can circulate water over the first wall and into the pre-filtration chamber. In some embodiments, the filtration unit can include at least one unit magnet and a cover including at least one cover magnet. In some embodiments, the cover extends over portions of the top of the filtration unit, and in some embodiments, the cover is securable to top of the filtration unit via the attraction between the at least one unit magnet and the at least one cover magnet. In some embodiments, the filtration unit includes a light support having a plurality of lights, which lights can illuminate the top of the filtration unit. In some embodiments, the light support is moveable between a first position and a second position, and in some embodiments, the light support is relatively closer to the top of the filtration unit in the first position that in the second position.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Some embodiments relate to a filtration unit that can use the biological processes of a plant to filter water, and particularly to filter water from an aquarium. In such an embodiment, the filtration unit can be configured to provide water circulation through the root network of the plant. In such an embodiment, as the degree of water circulation through the root network of the plant increases, so does the degree of filtration achieved by the filtration unit and the degree of nourishment provided to the plant. The proper functioning of the filtration unit can be achieved by preparing water for circulation through the root network of the plant, facilitating the conversion of biological objects/debris in the water to nutrients usable by the plant, and maintaining a desired level of circulation through the filtration unit.

In some embodiments, the filtration unit can include one or several features to prepare the water for being circulated through the root network of the plant. In some embodiments, this preparation can include, for example, the eliminating of large objects from the water. In some embodiments, such large objects can obstruct water to flow through the root network of the plant, and can thus limit the effectiveness of the filtration unit. These large object can be removed by one or several sedimentation chambers/areas, one or several sponges, one or several separators, or the like.

In some embodiments, the filtration unit can include one or several features to facilitate root growth and/or to facilitate the conversion of biological material to nutrients usable by the plant. In some embodiments, this conversion of biological material into nutrients usable by the plant can be performed by bacteria. In some embodiments, the filtration unit can include one or several features to facilitate the growth of these bacteria. In one particular embodiment, the filtration unit can include a cage that can contain an aggregate. The cage can be designed so as to allow the flow of water through the cage and to allow the growth of the plant roots into and through the cage. The aggregate can be contained in the cage and the aggregate can provide a surface area on which these bacteria can grow. The aggregate can be any type of aggregate, but in some embodiments, the aggregate can include particulates that be selected so as to have a large surface area to allow the growth of a greater number of bacteria. This large surface area can be achieved by, for example, decreasing the average size of the particulates, or by increasing the average porosity of the particulate.

In some embodiments, the filtration unit can include one or several pumps that can be configured to circulate water from the aquarium through the filtration unit and back into the aquarium. The one or several pumps can be sized and shaped to provide a desired level of water circulation through the filtration unit. Additionally, in some embodiments, the filtration unit can include one or several lights that can be positioned so as to illuminate the plant and to facilitate growth of the plant.

The combination of some or all of these features results in a filtration unit that can maintain the health of an aquarium over an extended period of time while requiring minimal maintenance and that simultaneously maintains the health of the plant over an extended period of time while requiring minimal maintenance. Thus, the combination of the above mentioned features can create a balanced ecosystem in which both the plant and the inhabitants of the aquarium such as, for example, fish, can survive with minimal maintenance and intervention.

Figure 1:
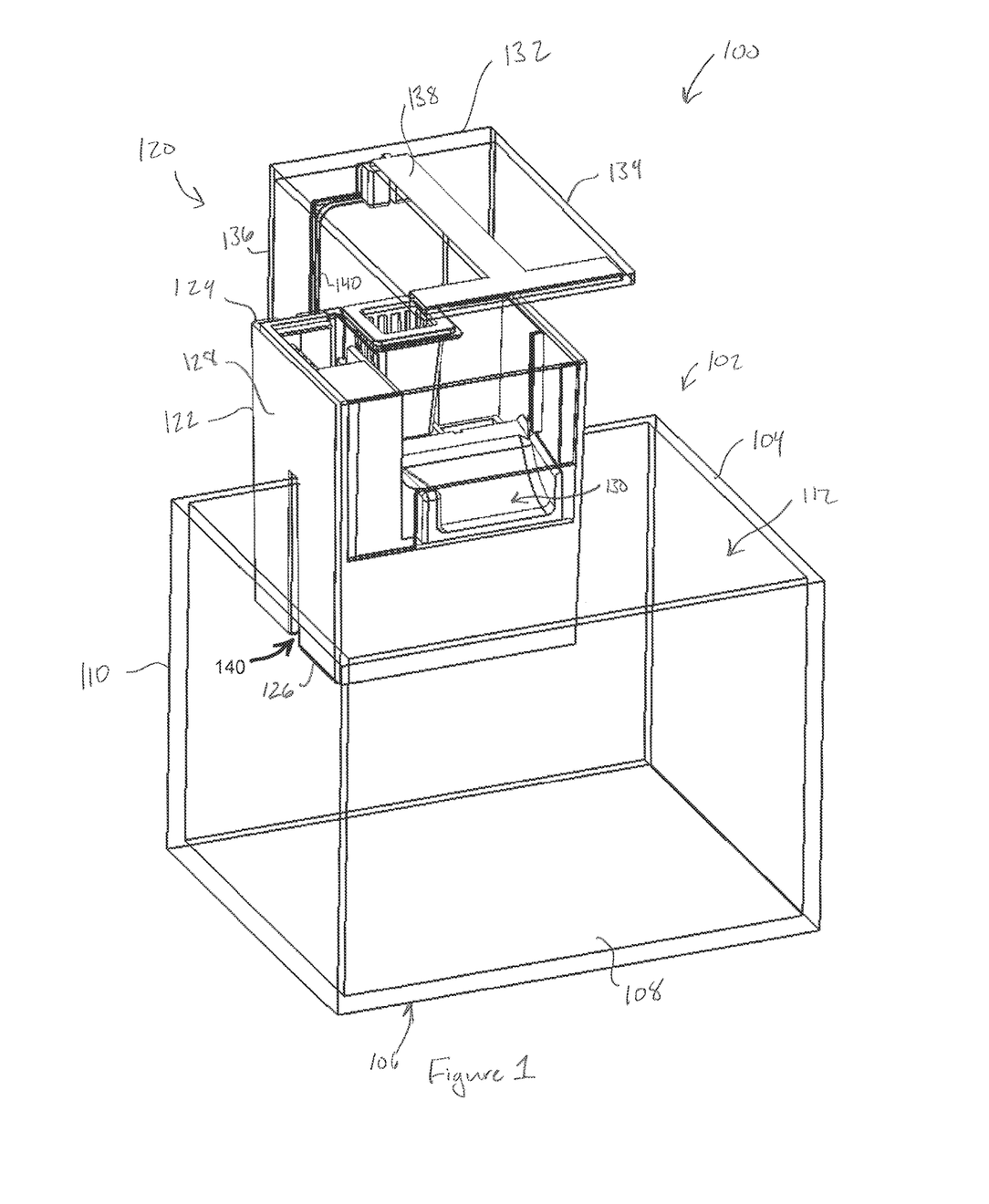
FIG. 1 is a perspective view of one embodiment of a filtration system.

With reference now to FIG. 1, a perspective view of one embodiment of a filtration system 100 is shown. In some embodiments, filtration system 100 can be sized for a home aquarium, and in some embodiments, filtration system 100 can be sized for aquaculture. Filtration system 100 includes an aquarium 102 having a top 104, a bottom 106 defined by a base plate 108, and sides 110 extending from the base plate 108 to the top 104. The combination of base plate 108 and sides 110 together defines an internal volume 112 of aquarium 102 that can, in some embodiments, contain water and plants and animals living in the water. Aquarium 102 can comprise any desired shape and size and can be made from a variety of materials. In some embodiments, aquarium 102 can hold any volume of water including, for example, 0.01 gallons, 0.1 gallons, 0.5 gallons, 1 gallon, 2 gallons, 5 gallons, 10 gallons, 25 gallons, 50 gallons, 100 gallons, 500 gallons, 1,000 gallons, 10,000 gallons, 100,000 gallons, 1,000,000 gallons, and/or any other or intermediate volume of water. In the embodiment depicted in FIG. 1, aquarium 102 comprises a rectangular prism that can be made of a transparent material such as, for example, acrylic, polycarbonate, or the like.

Filtration system 100 can include a filter unit 120, also referred to herein as the filtration unit. Filter unit 120 can be configured to allow the circulation of water through a root system of a plant that can be contained in filter unit 120. Filter unit 120 can include a body 122 that can include a top 124, a bottom 126, and a plurality of sides 128 connecting the top 124 and the bottom 126 of filter unit 120. Body 122 can include an inlet (not shown) located in or near bottom 126 through which water can enter body 122 and a spout 130 via which water can leave body 122. Body 122 of filter unit 120 can comprise a variety of shapes and sizes and can be made from a variety of materials. In some embodiments, body 122 of filter unit 120 can be made from a polymer such as, for example, a thermoplastic including, for example, acrylonitrile butadiene styrene (ABS), that can, in some embodiments, have a coating to prevent the growth of algae and/or undesired bacteria on body 122.

Filter unit 120 can include a light support 132. Light support 132 can be movably attached to body 122 of filter unit 120. In one embodiment, light support 132 can be moved from a first position relative to top 124 of body 122 to a second position relative to top 124 of body 122. In some embodiments, the first position relative to top 124 of the body 122 can be relatively closer to top 124 of body 122 than the second position. This movable attachment of light support 132 to body 122 can allow for the growth of the plant.

Light support 132 can include a support plate 134 and one or several vertical supports 136. Support plate 134 can support one or several lights and/or light sources including, for example, one or several light bulbs, filaments, light emitting diodes (LEDs), or the like. In some embodiments, the support plate can support 3, 4, 5, 6, 7, 8, 9, 10, 12, 15, 20, 25, 50, and/or any other or intermediate number of lights. In some embodiments, these lights can be configured to illuminate top 124 of body 122, and particularly to illuminate the plant to facilitate growth of the plant. These lights can provide electromagnetic radiation of any desired wavelength and can, for example, generate light across the visible spectrum and/or generate visible light from a portion of the visible spectrum such as, for example, colored light. The lights can be located in a connector 138 which can include features to electrically connect the lights to a power sources. The connector can have any desired shape, and in some embodiments, connector 138 can comprise a T-shape.

As seen in FIG. 1, vertical supports 136 extend from support plate 134 and connect to body 122. In some embodiments, a wire 140 can extend along a portion of vertical supports 136 and can electrically connect, at one end, with connector 138 and/or with the lights, and at the other end either directly or indirectly with a power source. Wire 140 can comprise a variety of shapes and sizes and can be made from a variety of materials. In some embodiments, wire 140 can comprise a conductive material and can conduct electricity to connector 138 and/or the lights.

In some embodiments, filter unit 120 and particularly body 122 can include one or several mounting features. These mounting features can be configured for attaching filter unit 122 and particularly body 122 to aquarium 102. In the embodiment depicted in FIG. 1, the mounting feature comprises a slot 180. Slot 180 can be sized and shaped to receive one or more of sides 110 of aquarium 102. Slot 180 can extend from bottom 126 of body 122 towards top 124 of body 122.

Figure 2:
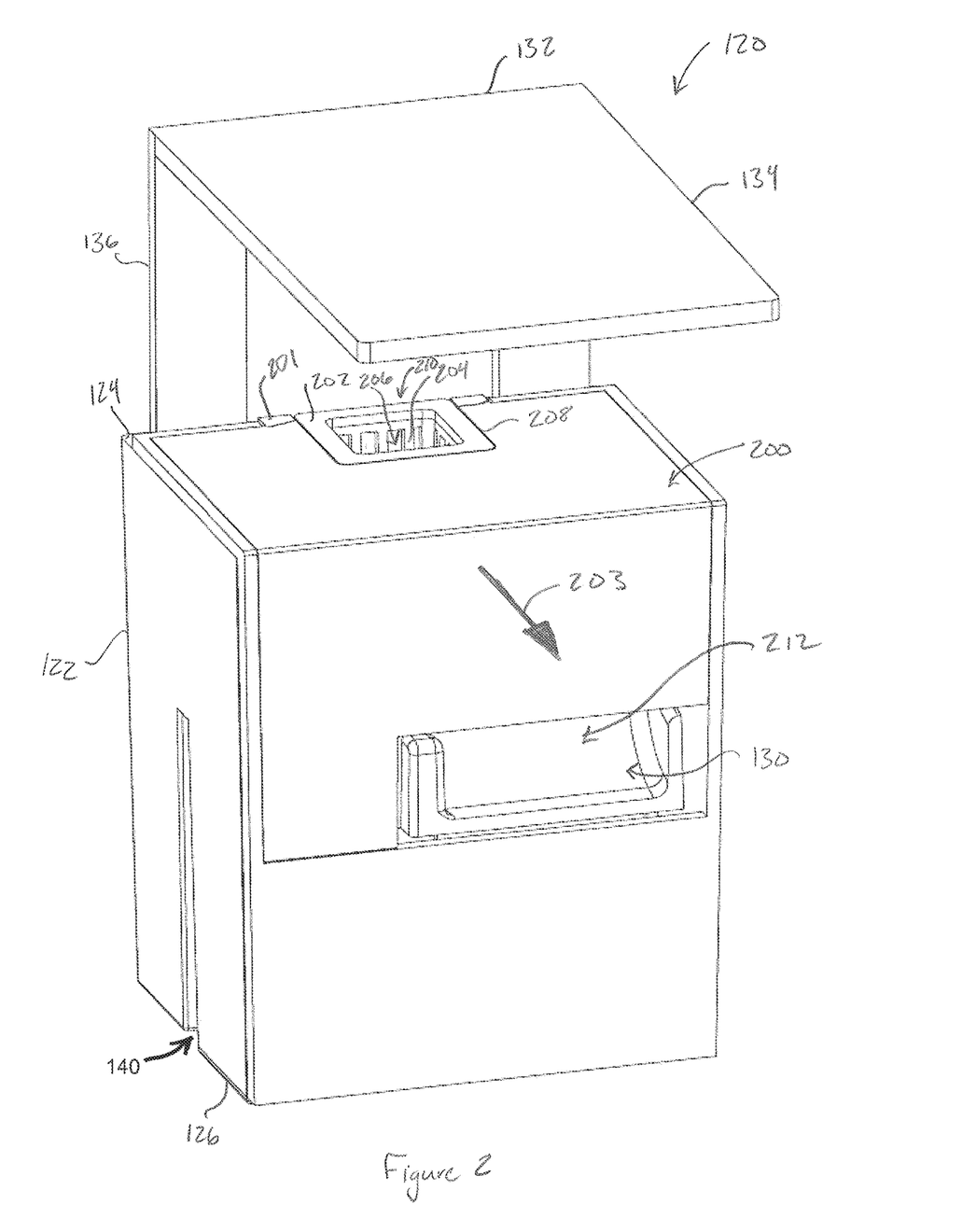
FIG. 2 is a perspective view of one embodiment of a filtration unit with a cover attached.

With reference now to FIG. 2, a perspective view of one embodiment of the filter unit 120 is shown. Filter unit 120 includes body 122 having top 124, bottom 126, and sides 128 extending therebetween. Spout 130 is located in one of sides 128 between top 124 and bottom 126 of body 122. As further seen, filter unit 120 includes light support 132 including support plate 134 and vertical support 136. The light support 132 can comprise any desired size and shape and can be made from any desired material. In some embodiments, the light support 132 can comprise a heat resistant polymer such as, for example, polycarbonate. In some embodiments, use of a heat resistant polymer such as, for example, polycarbonate can allow the mounting of the lights directly into and/or onto the light support 132.

Filter unit 120 further includes a cover 200. Cover 200 can overlay and protect portions of filter unit 120 and can particularly overlay and protect all or portions of the root network of the plant. Cover 200 can comprise a variety of shapes and sizes and can be made of a variety of materials. In the embodiment of FIG. 2, cover 200 overlays top 124 of body 122 and extends from top 124 to bottom 126 along side 128 containing spout 130.

Cover 200 can be configured to be removable from body 122 in any desired direction. In the embodiment of FIG. 2, cover 200 can be removed from body 122 in the direction indicated by arrow 203. Advantageously, removal of cover 200 in the direction indicated by arrow 203 protects the plant from damage that could occur if cover 200 was removed in other directions. The cover 200 can comprise a variety of shapes and sizes, and can be made from a variety of materials. In some embodiments, the cover 200 can be made from a polymer such as, for example, polycarbonate.

In some embodiments, cover 200 can be attached and/or secured to body 122. This securement can prevent cover 200 from falling from body 122 and can likewise prevent damage to the plant that could occur from such a fall. In some embodiments, cover 200 can be attached and/or secured to body 122 via one or several magnets 201 located on and/or integrated in cover 200. Magnets 201, also referred to herein as cover magnets, can mate with corresponding magnets, also referred to herein as unit magnets or filter unit magnets, located on body 122.

Filter unit 120 can further include a root basket 202 that can be connected to body 122. Root basket 202 can receive a plant and can contain a portion of the plant and of the root network of the plant. In some embodiments, root basket 202 can be further configured to receive media in which the plant can grow. This media can include, for example, dirt, sand, clay, moss, one or several sponges, a combination of the previously listed media, or the like. In some embodiments, root basket 202 can comprise one or several slats 204 and one or several inter-slat spaces 206 between slats 204. In some embodiments, inter-slat spaces 206 can be sized and shaped to allow the root network of the plant to grow outside of root basket 202, but also sized and shaped to retain, for example, the media within root basket 202.

As seen in FIG. 2, root basket 202 extends to top 124 of body 122. In some embodiments, light support 132 can be positioned so that support plate 134 is proximate to and/or in contact with top 124 and/or the portion of cover 200 overlaying top 124. In such a position, support plate 134 can facilitate germination of one or several seeds contained in media in root basket 202 by limiting airflow to root basket 202 and thereby preventing the drying of the media.

In some embodiments, the cover 200 can include a plant aperture 208. The plant aperture 208 can be positioned to overlay root basket 202 when cover 200 is positioned on body 122, and particularly can allow a plant to extend from within body 122 to outside of body 122. In some embodiments, plant aperture 208 can be enclosed on all sides, and in some embodiments, and as depicted in FIG. 2, plant aperture 208 is not enclosed on all sides, but rather has an open side 210. Advantageously, open side 210 allows cover 200 to be slidably removed from body 122 without damaging the plant.

In some embodiments, cover 200 includes a spout aperture 212. Spout aperture 212 can be sized and shaped to allow all or portions of spout 130 to extend through cover 300. Advantageously, spout aperture 212 can prevent removal of cover 200 in directions other than indicated by arrow 203, and can thereby prevent damage to the plant when cover 200 is removed from body 122.

Figure 3:
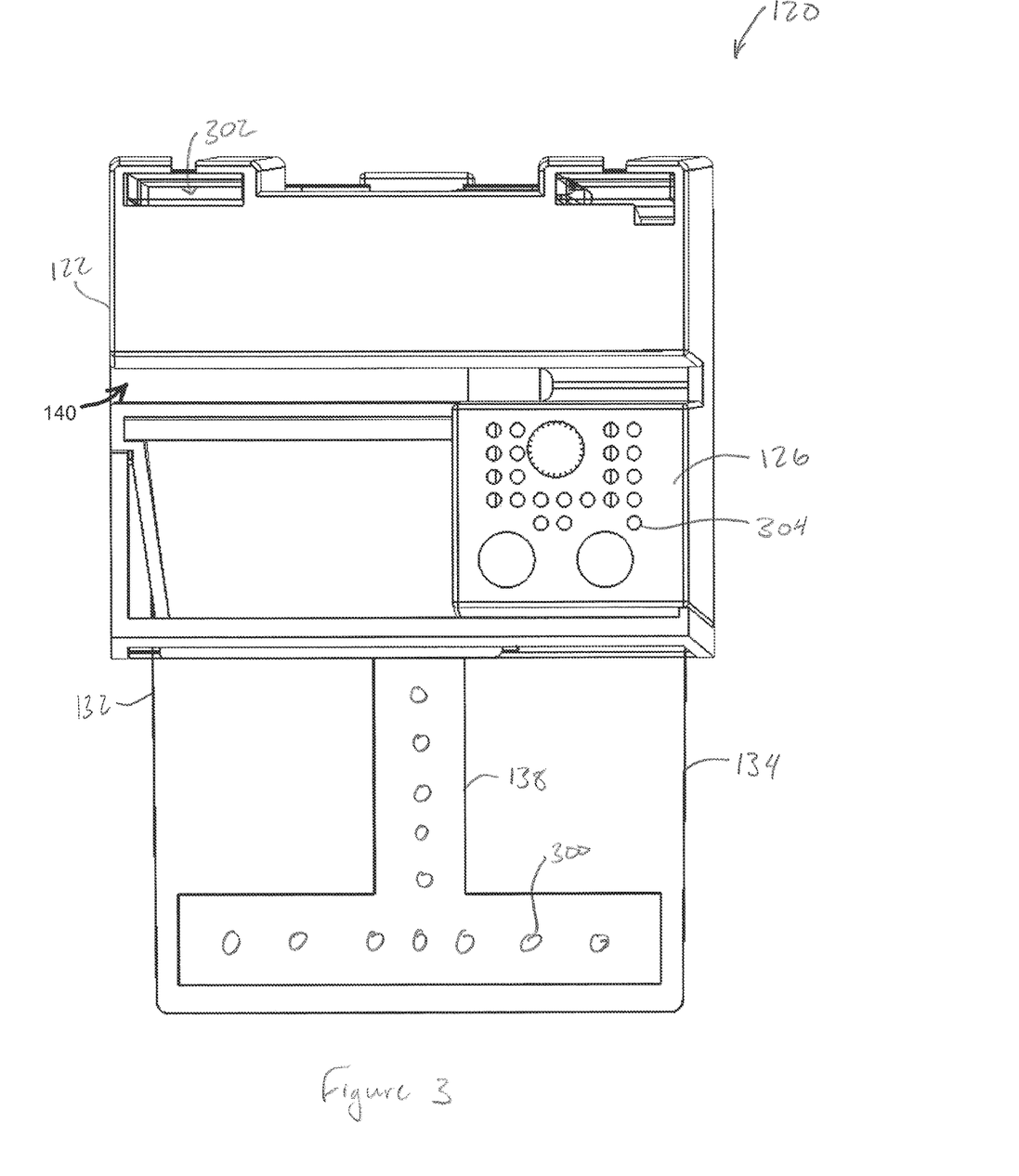
FIG. 3 is a bottom view of one embodiment of a filtration unit.

With reference now to FIG. 3, a bottom view of one embodiment of filter unit 120 is shown. As seen, filter unit 120 can include body 122 having bottom 126, and light support 132 including support plate 134, and connector 138. As seen, connector 138 can include lights 300, that were discussed above. As further seen in FIG. 3, light support 132 can connect to body 122 via receiving apertures 302, and particularly, vertical supports 136 can extend into and/or through receiving apertures 302. In some embodiments, receiving apertures 302 can be sized and shaped to securingly receive vertical supports 136 so that vertical supports 136 do not move relative to receiving apertures 302 unless an external force is applied to light support 132.

As further seen in FIG. 3, in some embodiments, body 122 can include one or several apertures 304. Apertures 304 can be located in bottom 126 of body 122, proximate to bottom 126 of body 122, and/or at any other location on body 122. In some embodiments, apertures 304 can allow water to pass into body 122, and in some embodiments, can allow water to be pumped into body 122.

Figure 4:
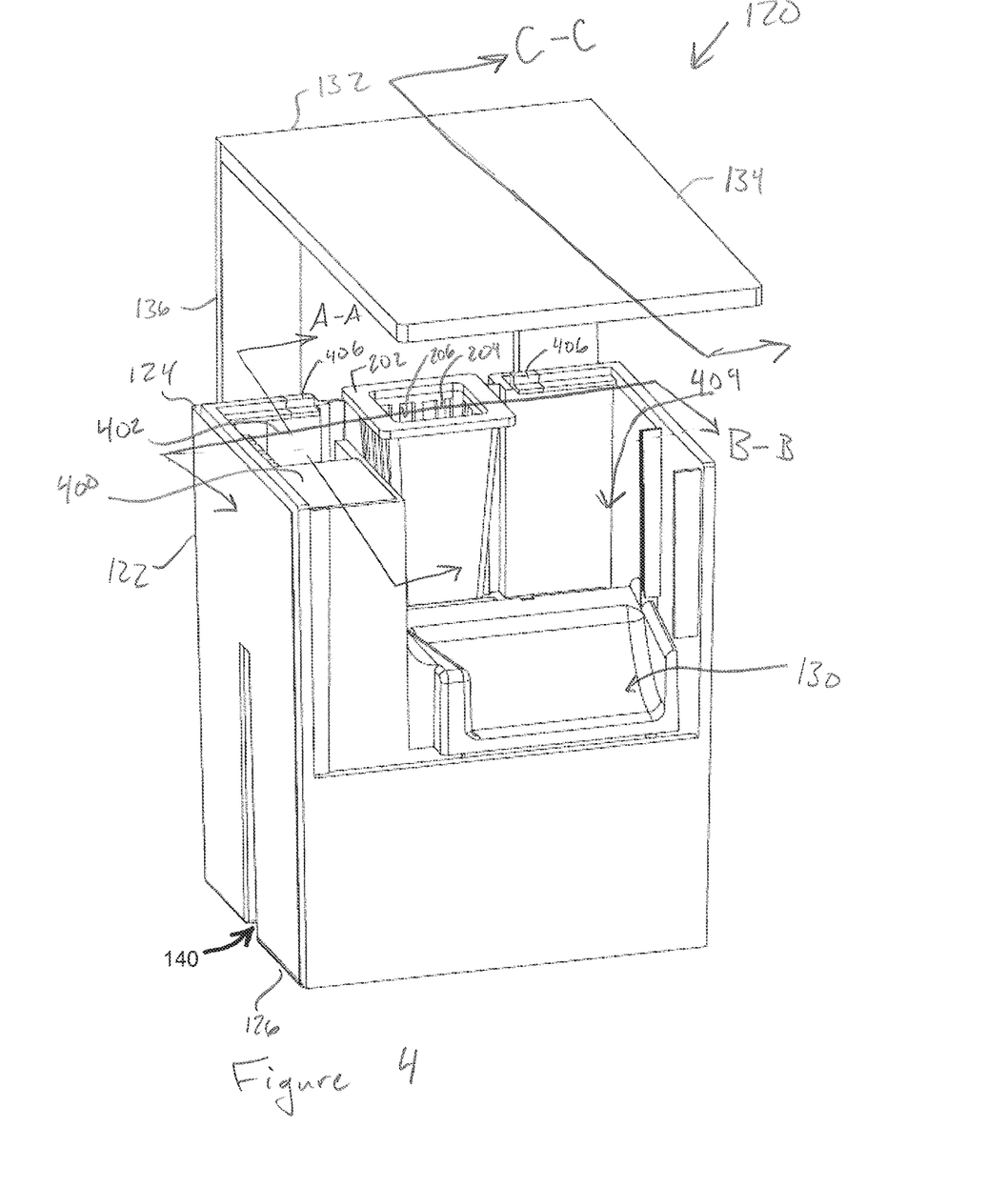
FIG. 4 is a perspective view of one embodiment of a filtration unit without a cover attached.

With reference now to FIG. 4, a perspective view of one embodiment of filter unit 120 is shown with cover 200 removed. As seen, filter unit 120 can include body 122 having top 124, bottom 126, sides 128 extending between top 124 and bottom 126, and spout 130. Filter unit 120 can further include light support 132 including support plate 134, and vertical supports 136. As further seen in FIG. 4, filter unit 120 can include root basket 202 having slats 204 and inter-slat spaces 206.

Body 122 defines several chambers that contain features to perform different functions. Body 122 includes a sterilization chamber 500 that is covered by a sterilization-chamber cover 400. Sterilization chamber 500 can be fluidly connected with apertures 304 and can include a pump that pumps water through apertures 304 and circulates the water throughout filter unit 120. Sterilization chamber 500 can additionally include one or several features configured to sterilize the water passing through the sterilization chamber, and particularly to kill any algae or bacteria in the water passing through the sterilization chamber. In one embodiment, these features can include, for example, one or several sterilization chemicals, one or several sterilization lights, or the like. In one embodiment, for example, the one or several sterilization lights can comprise one or several UV lights, and particularly one or several UV light emitting diodes (UV LEDs).

Adjacent to sterilization chamber 500 is a pre-filtration chamber 402. In some embodiments, pre-filtration chamber 402 can include one or several features configured to remove some objects from the water circulated through filter unit 120 including, for example, some suspended objects and/or some organic objects. In some embodiments, the pre-filtration chamber 402 can prevent these suspended objects from entering the root network of the plant, and potentially clogging the root network of the plant. In some embodiments, pre-filtration chamber 402 can be configured to eliminate these objects via sedimentation and/or via filtration. In some embodiments, pre-filtration chamber 402 can include, for example, a filtration member that can remove large objects from the circulating water and that can disrupt the flow of water through pre-filtration chamber 402 to facilitate sedimentation.

Adjacent to pre-filtration chamber 402 is a root chamber 404. Root chamber 404 hold some or all of the root network of the plant and/or contains some or all of root basket 202. Root chamber 404 can be fluidly connected to pre-filtration chamber 402 and can extend from bottom 126 of body 122 to spout 130 of body 122.

As additionally seen in FIG. 4, body 122 can include unit magnets 406 that can interact with cover magnets 201 to secure cover 200 to body 122. Both unit magnets 406 and cover magnets 201 can comprise a variety of shapes, types, and sizes, and can be located in and/or on any desired portion of body 122 and/or cover that allows the securing of cover 200 to body 122.

Figure 5:
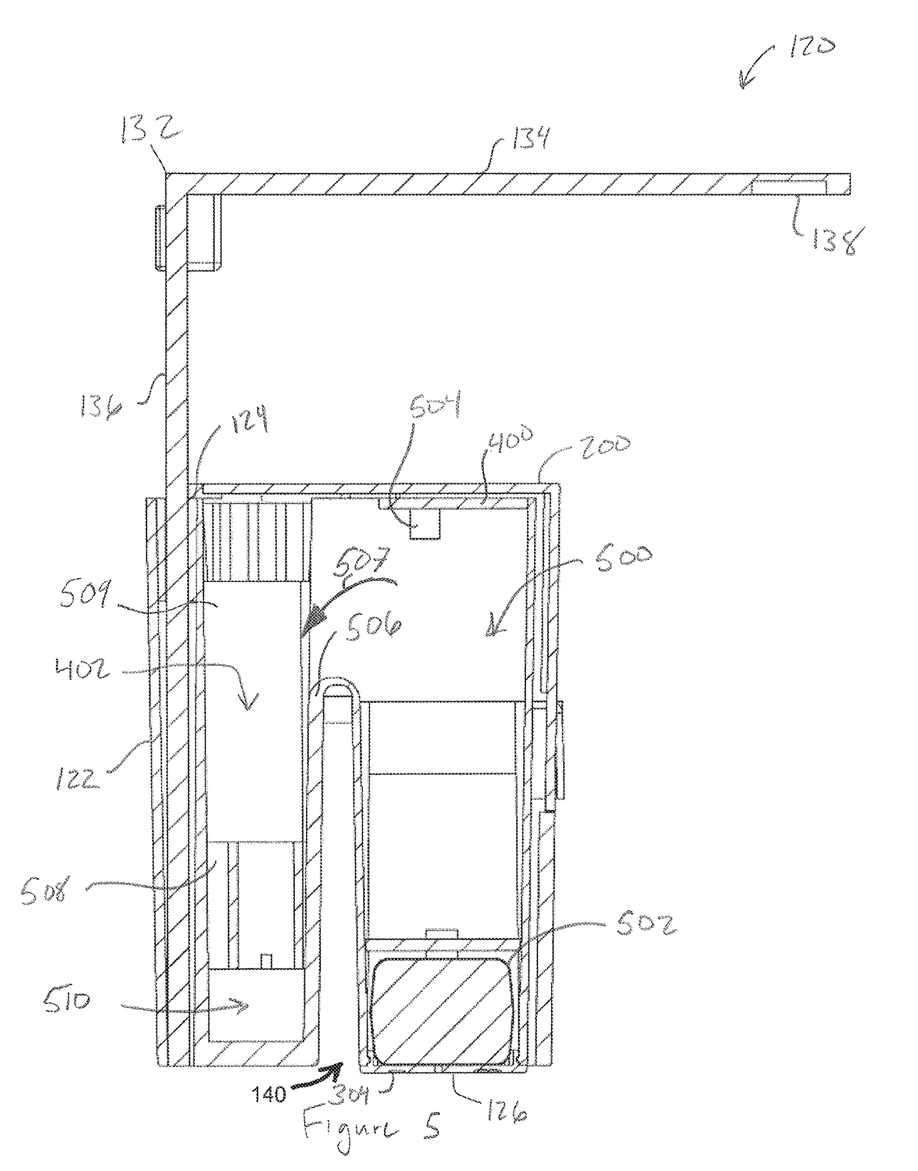
FIG. 5 is a side-section view of one embodiment of a filtration unit.

With reference now to FIG. 5, a side-section view of one embodiment of filtration unit 120, taken along cutting plane A-A of FIG. 4, is shown. Filtration unit 120 includes body 122 having top 124, bottom 126 with aperture 304, and sides 128 extending between top 124 and bottom 126, and light support 132 including support plate 134, vertical support 136, and Growth of bacteria responsible for the of biological objects in the water biodegradation the gradation Such as, for example, the greater the degree of filtration achieved by the filtration unit and connector 138. Cover 200 is positioned to overlay top 124 of body 122.

As seen in FIG. 5, body 122 includes a sterilization chamber 500 having those features discussed above. In some embodiments, sterilization chamber 500 includes a pump 502 that can be located proximate to bottom 126 of body 122 and/or proximate to apertures 304. Pump 502 can comprise any desired type of pump, and can be sized to circulate a desired amount of water through body 122. In some embodiments, pump 502 can be configured to circulate approximately 10 gallons per minute, approximately 20 gallons per minute, approximately 30 gallons per minute, approximately 50 gallons per minute, approximately gallons per minute, approximately 60 gallons per minute, approximately 70 gallons per minute, approximately 100 gallons per minute, between 20 and 100 gallons per minute, between 40 and 80 gallons per minute, between 50 and 60 gallons per minute, and/or any other or intermediate number of gallons per minute. As used herein, "approximately" includes values within +/−20 percent, +/−10 percent, +/−5 percent, +/−1 percent, and/or any other or intermediate percent of the indicated value. A person of skill in the art will appreciate that the circulation rate of pump 502 will depend on the size of aquarium 102 and filtration needs.

In some embodiments, pump 502 can be connected to a controller that can control the operation of pump 502, and in some embodiments, can likewise control the operation of the lights 300. In some embodiments, the controller can control the pump rate, the pump duty, whether pump 502 is powered, or the like. In some embodiments, the controller can control the operation of the lights, including, for example, which of the lights is on, the intensity of the lighting, the duty cycle of the lighting, the color of the lighting, or the like.

In some embodiments, sterilization chamber 500 can be covered by sterilization-chamber cover 400, and in some embodiments, sterilization chamber 500 can include a sterilization feature 504, which can be configured to sterilize the circulated water and/or to kill bacteria and/or algae in the water. In some embodiments, sterilization feature 500 can be, for example, a UV LED.

Body 122 further includes pre-filtration chamber 402 that can be separated from sterilization chamber 500 and pump 502 by a first wall 506. In some embodiments, first wall 506 can extend from bottom 126 towards top 124 of body 122, and can terminate before reaching top 124 of body. In such an embodiment, first wall 506 does not contact sterilization-chamber cover 400, but rather leaves a space between itself and sterilization-chamber cover 400.

In some embodiments, as water is circulated through body 122, pump 502 fills up sterilization chamber 500 and water then flows over first wall 506 into pre-filtration chamber 402 as indicated by arrow 507. In some embodiments, pre-filtration chamber 402 can include a filtration feature 508 that can remove some objects from the water circulated through filter unit 120 including, for example, some suspended objects and/or some organic objects. In some embodiments, filtration feature 508 can be a sponge, and particularly a large pore sponge configured to filter objects from water that are larger than 0.1 mm, 0.2 mm, 0.5 mm, 1.0 mm, 1.5 mm, 2 mm, 2.5 mm, 3 mm, 5 mm and/or any other or intermediate size. In some embodiments, the sponge can be held within a sponge holder. Filtration feature 508 can be located on bottom 126, and in some embodiments, can be located proximate to bottom 126. In some embodiments, filtration feature 508 can be positioned approximately 0.1 inches, 0.2 inches, 0.5 inches, 1.0 inches, 1.5 inches, 2 inches, 2.5 inches, 3 inches, and/or any other or intermediate distance from bottom 126.

In some embodiments, pre-filtration chamber 402 can include a second wall 509 that separates pre-filtration chamber 402 from root chamber 404. In such an embodiment, second wall 509 can be positioned above bottom 126 so as to create an inlet 510 into root chamber 404 from pre-filtration chamber 402. In some embodiments, second wall 509 can be positioned approximately 0.1 inches, 0.2 inches, 0.5 inches, 1.0 inches, 1.5 inches, 2 inches, 2.5 inches, 3 inches, and/or any other or intermediate distance from bottom 126. Advantageously, placement of inlet 510 proximate to bottom can result in better circulation of water through root chamber 404, and can result in better and more efficient filtration of the water and better and more efficient feeding of the plant.

In the embodiment depicted in FIG. 5, as water enters into pre-filtration chamber 402 over first wall 506, it impinges upon filtration feature 508 and large objects are removed from water. After passing through filtration feature 508, water passes through inlet 510 into root chamber 404.

Figure 6:
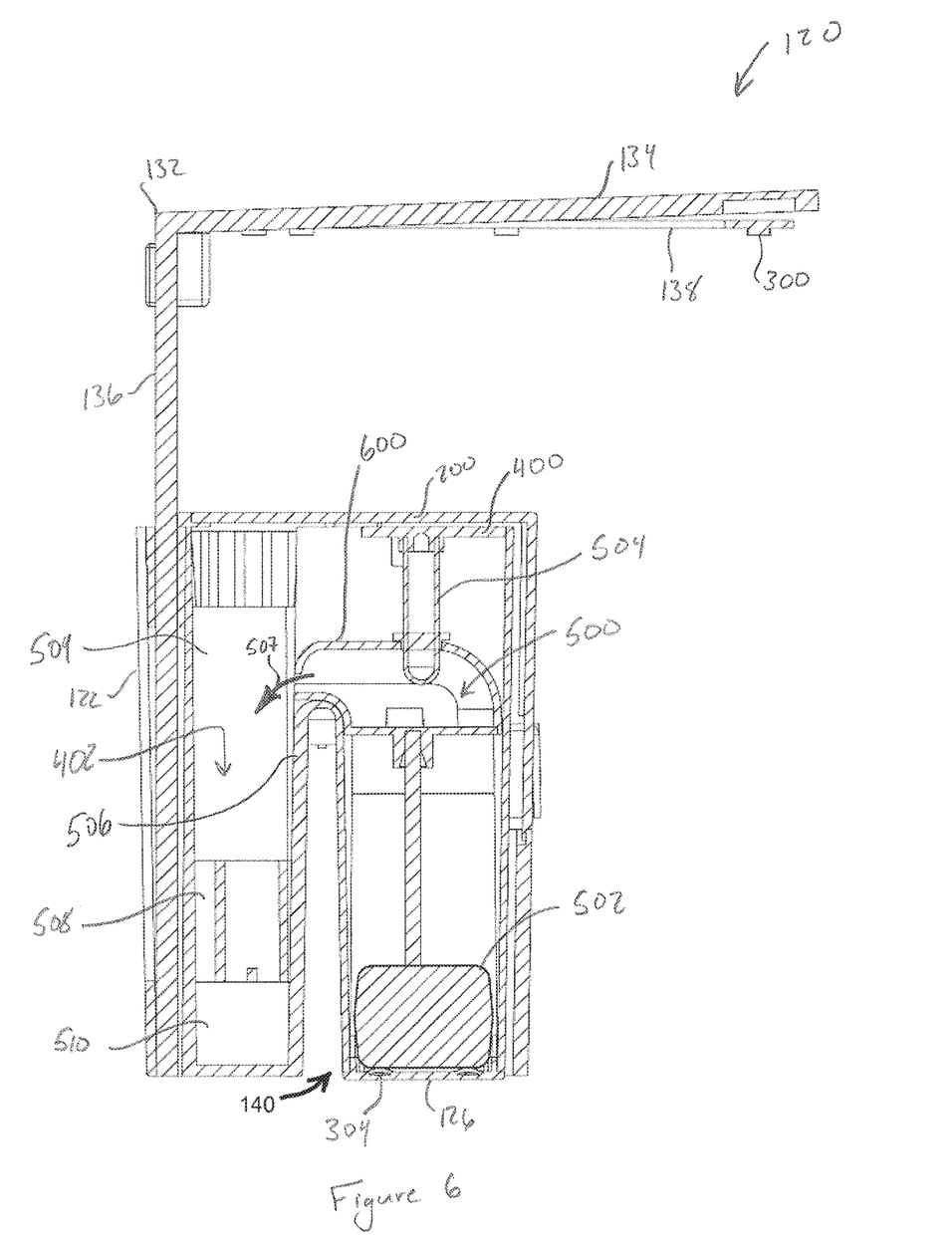
FIG. 6 is a side-section view of one embodiment of a filtration unit with a flow channel.

With reference now to FIG. 6, a side-section view, taken along cutting plane A-A of FIG. 4, of one embodiment of a filtration unit 120 with a flow channel 600 is shown. Filtration unit 120 shown in FIG. 6 includes the same features as filtration unit 120 shown in FIG. 5, but additionally includes flow channel 600. Flow channel 600 can be positioned in sterilization chamber 500 and can receive water from pump 502 and direct water past sterilization feature 504 and into pre-filtration chamber 402. In some embodiments, and as seen in FIG. 6, sterilization feature 504 can protrude into flow channel 600 so that water in flow channel can be sterilized.

Figure 7:
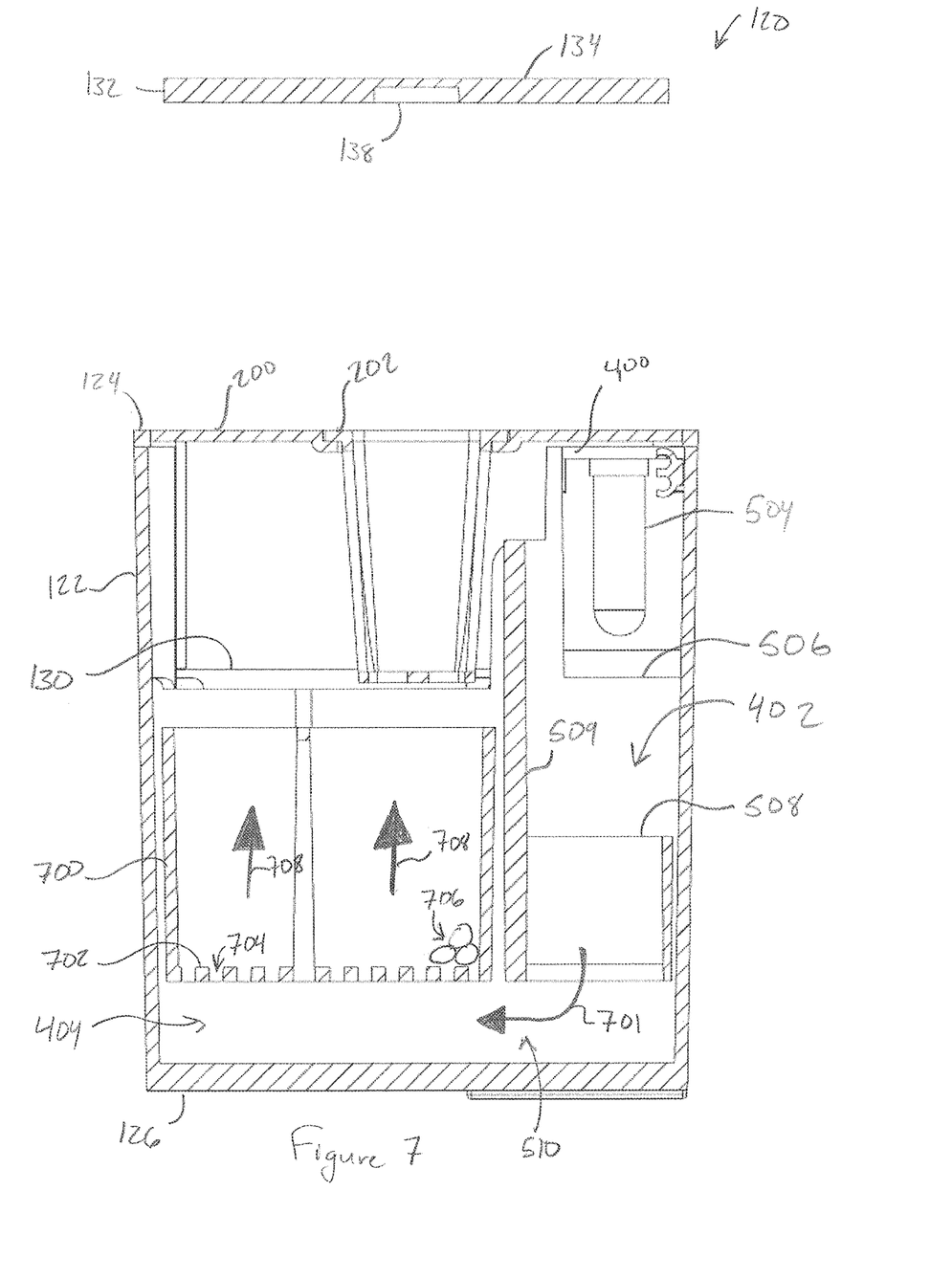
FIG. 7 is a front-section view of one embodiment of a filtration unit.

With reference now to FIG. 7, a front-section view of one embodiment of a filtration unit 120, taken along cutting plane B-B shown in FIG. 4 and facing towards spout 130, is shown. Filter unit 120 includes body 122 having top 124, bottom 126, and spout 130 and light support 132 having support plate 134 and connector 138. Cover 200 is positioned on top 124 of body 122, and root basket 202 is extending into body 122.

Filter unit 120 includes sterilization-chamber cover 400 from which sterilization feature 504 extends. As mentioned above, water is sterilized by sterilization feature 504 when passing through sterilization chamber 500. After sterilization, water passes over first wall 506 and into pre-filtration chamber 402, where water passes through filtration feature 508 and through inlet 510 in second wall 509 and into root chamber 404 as indicated by arrow 701.

Root chamber 404 includes cage 700 that can be configured to contain all or portions of the root network of the plant. Cage 700 can include one or several cage slats 702 and one or several inter-slat cage spaces 704. Cage slats 702 and inter-slat cage spaces 704 can be designed to allow water to pass through cage 700 but to retain aggregate 706 within cage 702.

Aggregate 706 can be contained in cage 702 and aggregate 706 can provide a surface area on which bacteria can grow, which bacteria can, for example, generate nutrients for the plant from biological material in the water. Aggregate 706 can be any type of aggregate, but in some embodiments, aggregate 706 can be selected so as to have a large surface area to allow the growth of a greater number of bacteria. Specifically, in some embodiments, aggregate 706 can be a lava rocks, pumice pieces, activated charcoal pellets, carbon pellets, or the like. In some embodiments, aggregate 706 can fill all or portions of cage 700.

As seen in FIG. 7, and as indicated by arrows 708, water can pass through cage 700, and simultaneously through root chamber 404 from proximate to bottom 126 of body 122 to spout 130 of body 122.

Figure 8:
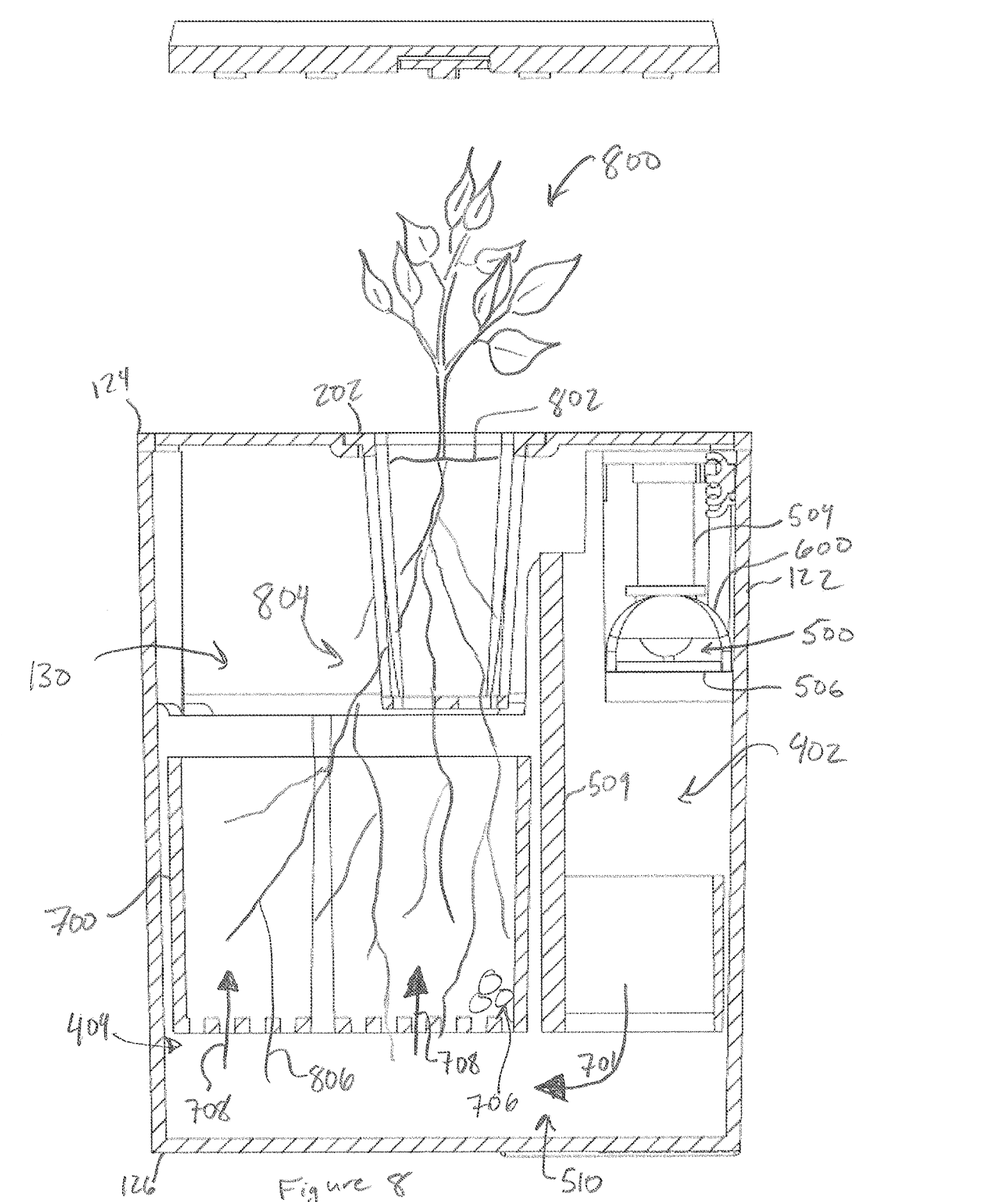
FIG. 8 is a front-section view of one embodiment of a filtration unit with a flow channel.

With reference now to FIG. 8, a front-section view, taken along cutting plane B-B shown in FIG. 4, of one embodiment of a filtration unit 120 with a flow channel 130 is shown. Filter unit 120 includes body 122 having top 124, bottom 126, and spout 130. Filter unit 120 further includes sterilization feature 504 that extends into flow channel 600. When water fills sterilization chamber 500, water is sterilized by sterilization feature 504 and passes through flow channel 600, over first wall 506, and into pre-filtration chamber. The water then passes through inlet 510 under second wall 509 as indicated by arrow 701 and into root chamber 404. In root chamber 404, water passes through cage 700 containing aggregate 706 and root system 804 of plant 800.

As seen in FIG. 8, plant 800 can be planted in media 802, which can be sand, clay, dirt, moss, sponge, or any other desired material, and contained in root basket 202. As further seen, root network 804 of plant 800 includes roots 806 that can extend into and/or through cage 700. In some embodiments, plant 800 can be selected to fill a filtration need. Specifically, in some embodiments, plant 800 can be selected to filter one or several chemicals or chemical compositions from the water, which one or several chemicals or chemical composition can have a biological source, such as a plant or animal, or a non-biological source such as, for example, a factory, a dump, radioactive waste, or the like. These non-biological chemicals can include, for example, one or several hydrocarbons like gasoline.

Figure 9:
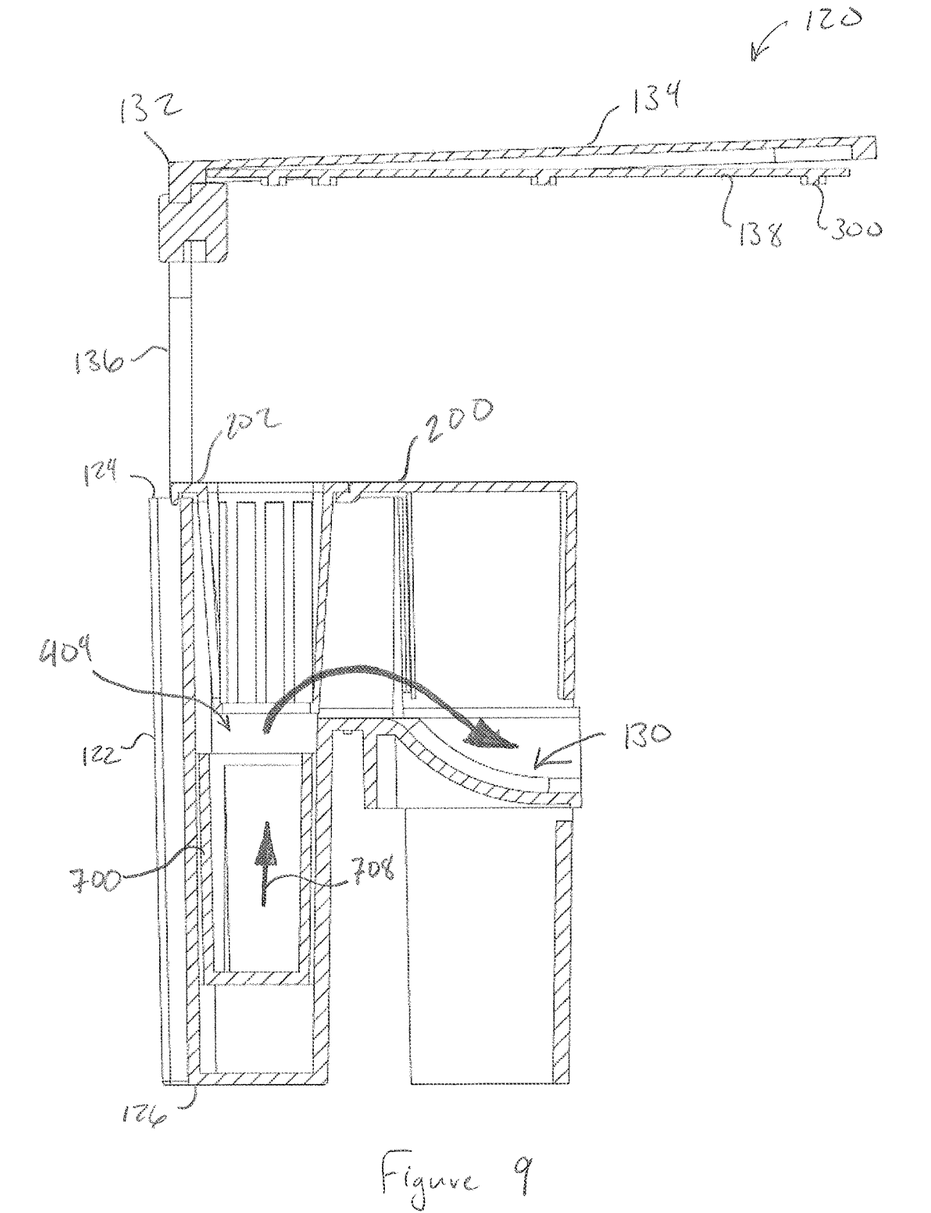
FIG. 9 is a side-section view of one embodiment of a filtration unit showing the spout.

With reference now to FIG. 9, is a side-section view taken at cutting plane C-C in FIG. 4 and showing one embodiment of filtration unit 120 is shown. Filtration unit 120 includes body 122 having top 124, bottom 126, and spout 130, and light support 132 including support plate 134, vertical support 136, connector 138, and lights 300. Top 124 of body 122 is overlaid by cover 200, and root basket 202 partially overlays top 124 and extends into root chamber 404.

As seen in FIG. 9, water flows through cage 700 and through root chamber 404 as indicated by arrow 708 from proximate to bottom 124 of body 122 to spout 130, and then flows out of root chamber 404 and out of body 122 via spout 130 as indicated by arrow 900. In some embodiments, as root basket 202 extends into root chamber 404, root chamber 404 at least partially encompasses root basket, and water wets portions of root basket 202, media contained by root basket 202, and/or roots 806 of root network 804 of plant 800 in root basket. The positioning of root basket 202 so that at least portions of root basket 202 are wet by water allows for the germination of seeds in root basket 202 and the growth and survival of a plant that has not yet developed a root network that extends into the root chamber.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

While the principles of the disclosure have been described above in connection with specific apparatuses and methods, it is to be clearly understood that this description is made only by way of example and not as limitation on the scope of the disclosure.

What is claimed is:

1. A filtration system comprising:
   an aquarium, wherein the aquarium comprises a bottom and a plurality of sides that define a volume configured to hold water; and
   a filtration unit partially extending into the aquarium, the filtration unit comprising a body defining a plurality of chambers and having a top and a bottom, the filtration unit comprising:
   a root chamber partially filled with aggregate and configured to hold a root system of a plant, wherein the root chamber has a spout proximate to the top of the filtration unit body and an inlet proximate to the bottom of the filtration unit body;
   a pre-filtration chamber containing a pre-filtration member, wherein the pre-filtration chamber is fluidly connected to the root chamber via the inlet; and
   a pump fluidly connected to an aperture in the body and configured to pump water into the body and to circulate water through pre-filtration chamber, the inlet of the root chamber, and to the spout of the root chamber.

2. The filtration system of claim 1, wherein the filtration unit further comprises a sterilization chamber.

3. The filtration system of claim 2, wherein the pump is configured to circulate water through the sterilization chamber before circulating the water through the inlet of the root chamber.

4. The filtration system of claim 3, wherein the sterilization chamber comprises a UV LED configured to illuminate water passing through the sterilization chamber.

5. The filtration system of claim 4, wherein the prefiltration chamber is separated from the sterilization chamber by a first wall.

6. The filtration system of claim 5, wherein the pump is configured to circulate water over the first wall and into the pre-filtration chamber.

7. The filtration system of claim 1, further comprising a root cage located in the root chamber, wherein the root cage is configured to allow water to flow through the root cage.

8. The filtration system of claim 1, wherein the pump is located within one of the plurality chambers of the body.

9. The filtration system of claim 1, wherein the aggregate comprises at least one of lava rocks and activated carbon pellets.

10. The filtration system of claim 1, wherein the filtration unit comprises a light support comprising a plurality of lights, wherein the lights are configured to illuminate the top of the filtration unit.

11. The filtration system of claim 10, wherein the light support is moveable between a first position and a second position, wherein the light support is relatively closer to the top of the filtration unit in the first position than in the second position.

12. A filtration unit comprising:
    a body configured for partial submersion in the fluid to be filtered defining a plurality of chambers, the body comprising:
    a top;
    a bottom;
    a root chamber at least partially filled with aggregate and configured to hold a root system of a plant wherein the root chamber has a spout proximate to the top of the filtration unit body and an inlet proximate to the bottom of the filtration unit body;
    a pre-filtration chamber containing a pre-filtration member, wherein the pre-filtration chamber is fluidly connected to the root chamber via the inlet; and
    a pump fluidly connected to an aperture in the body and configured to pump water into the body and to circulate water through the pre-filtration chamber, the inlet of the root chamber, and to the spout of the root chamber.

13. The filtration unit of claim 12, further comprising a sterilization chamber.

14. The filtration unit of claim 13, wherein the pump is configured to circulate water through the sterilization chamber before circulating the water through the inlet of the root chamber.

15. The filtration unit of claim 14, wherein the sterilization chamber comprises a UV LED configured to illuminate water passing through the sterilization chamber.

16. The filtration unit of claim 15, wherein the prefiltration chamber is separated from the sterilization chamber by a first wall.

17. The filtration unit of claim 16, wherein the pump is configured to circulate water over the first wall and into the pre-filtration chamber.

18. The filtration unit of claim 12, further comprising:
    at least one unit magnet; and
    a cover comprising at least one cover magnet, wherein the cover extends over portions of the top of the filtration unit, and wherein the cover is securable to top of the filtration unit via the attraction between the at least one unit magnet and the at least one cover magnet.

19. The filtration system of claim 12, wherein the filtration unit comprises a light support comprising a plurality of lights, wherein the lights are configured to illuminate the top of the filtration unit.

20. The filtration system of claim 19, wherein the light support is moveable between a first position and a second position, wherein the light support is relatively closer to the top of the filtration unit in the first position that in the second position.

* * * * *